(12) United States Patent
Hase et al.

(10) Patent No.: US 11,227,361 B2
(45) Date of Patent: Jan. 18, 2022

(54) IMAGE PROCESSING DEVICE WITH PARALLEL MEMORY ACCESS

(71) Applicant: RENESAS ELECTRONICS CORPORATION, Tokyo (JP)

(72) Inventors: Masaru Hase, Tokyo (JP); Takashi Saitou, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/867,940

(22) Filed: May 6, 2020

(65) Prior Publication Data

US 2021/0350500 A1 Nov. 11, 2021

(51) Int. Cl.
*G06T 1/20* (2006.01)
*G06T 1/60* (2006.01)

(52) U.S. Cl.
CPC . *G06T 1/60* (2013.01); *G06T 1/20* (2013.01)

(58) Field of Classification Search
CPC .................................. G06T 1/20; G06T 1/60
USPC ........................ 345/531, 533, 534, 535, 536
See application file for complete search history.

(56) References Cited

U.S. PATENT DOCUMENTS

| 10,461,956 B2 | 10/2019 | Tsuda et al. |
| 2006/0184737 A1 | 8/2006 | Yamada |
| 2016/0247253 A1* | 8/2016 | Kim .......................... G06T 1/20 |

FOREIGN PATENT DOCUMENTS

| JP | 2018-022319 A | 2/2018 |
| WO | 2016/094686 A1 | 6/2016 |

OTHER PUBLICATIONS

Extended European Search report issued in corresponding European Patent Application No. 21172201.2-1203, dated Sep. 28, 2021.

* cited by examiner

*Primary Examiner* — Jacinta M Crawford
(74) *Attorney, Agent, or Firm* — McDermott Will & Emery LLP

(57) ABSTRACT

An image processing device includes an application execution unit which executes an image processing application, an image processing circuit which performs image processing, a memory control circuit which is capable of accessing a plurality of memories and a memory allocation determination unit which determines a memory allocation of the image data on the basis of memory address management information, operation unit-specific information and application information. The application execution unit distributedly stores the image data in the plurality of memories on the basis of the memory allocation determined by the memory allocation determination unit.

10 Claims, 10 Drawing Sheets

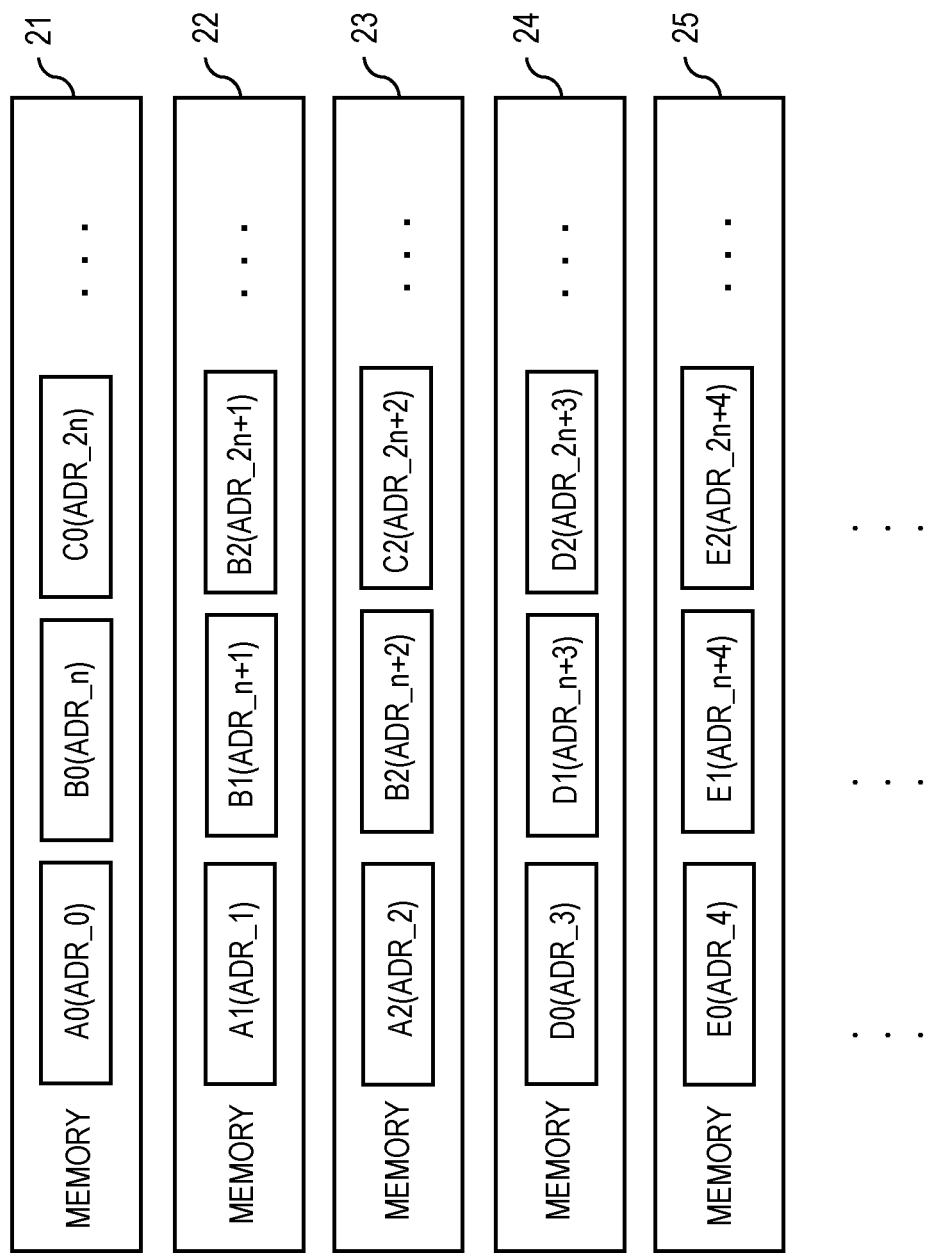

IMAGE PROCESSING DEVICE WITH PARALLEL MEMORY ACCESS

BACKGROUND

The present disclosure relates to an image processing device.

Recently, in the automobile market, there is a high demand for high resolution of driver cockpit and speedup of image processing performance for collision prevention. Therefore, image processing devices is required to read and process a large amount of image data stored in a memory at high speed.

One technique for reading data from memory at high speed is parallelization of memory access.

There are disclosed techniques listed below.
[Patent Document 1] Japanese Unexamined Patent Application Publication No. 2018-22319

Patent Document 1 discloses a technique in which an Intellectual Property (IP) core and a plurality of memories are connected in parallel, and the IP core accesses the plurality of memories simultaneously.

SUMMARY

However, even if the image processing device is connected to the plurality of memories in parallel, the effect of parallelization cannot always be expected. This is because, for example, when image data necessary for image processing is stored in the same memory, parallel access to the image data cannot be performed. As described above, in order to realize high-speed processing by parallelization in image processing, it is necessary to distributedly store image data necessary for the image processing in a plurality of memories so that the accesses to a specific memory are not concentrated.

Other objects and new features will be apparent from the description of this specification and the accompanying drawings.

An image processing device according to one embodiment includes an application execution unit which executes an image processing application, an image processing circuit which performs image processing, a memory control circuit which is capable of accessing a plurality of memories, and a memory allocation determination unit which determines a memory allocation of the image data on the basis of memory address management information, operation unit-specific information and application information. The application execution unit distributedly stores the image data in the plurality of memories on the basis of the memory allocation determined by the memory allocation determination unit.

According to one embodiment, since image data is stored in a plurality of memories so that the accesses to a specific memory are not concentrated, performance improvement by the parallelization of the memory access is expected.

BRIEF DESCRIPTION OF THE DRAWINGS

FIG. 10 is a diagram showing another example of the memory allocation candidate.

DETAILED DESCRIPTION

Figure 1:
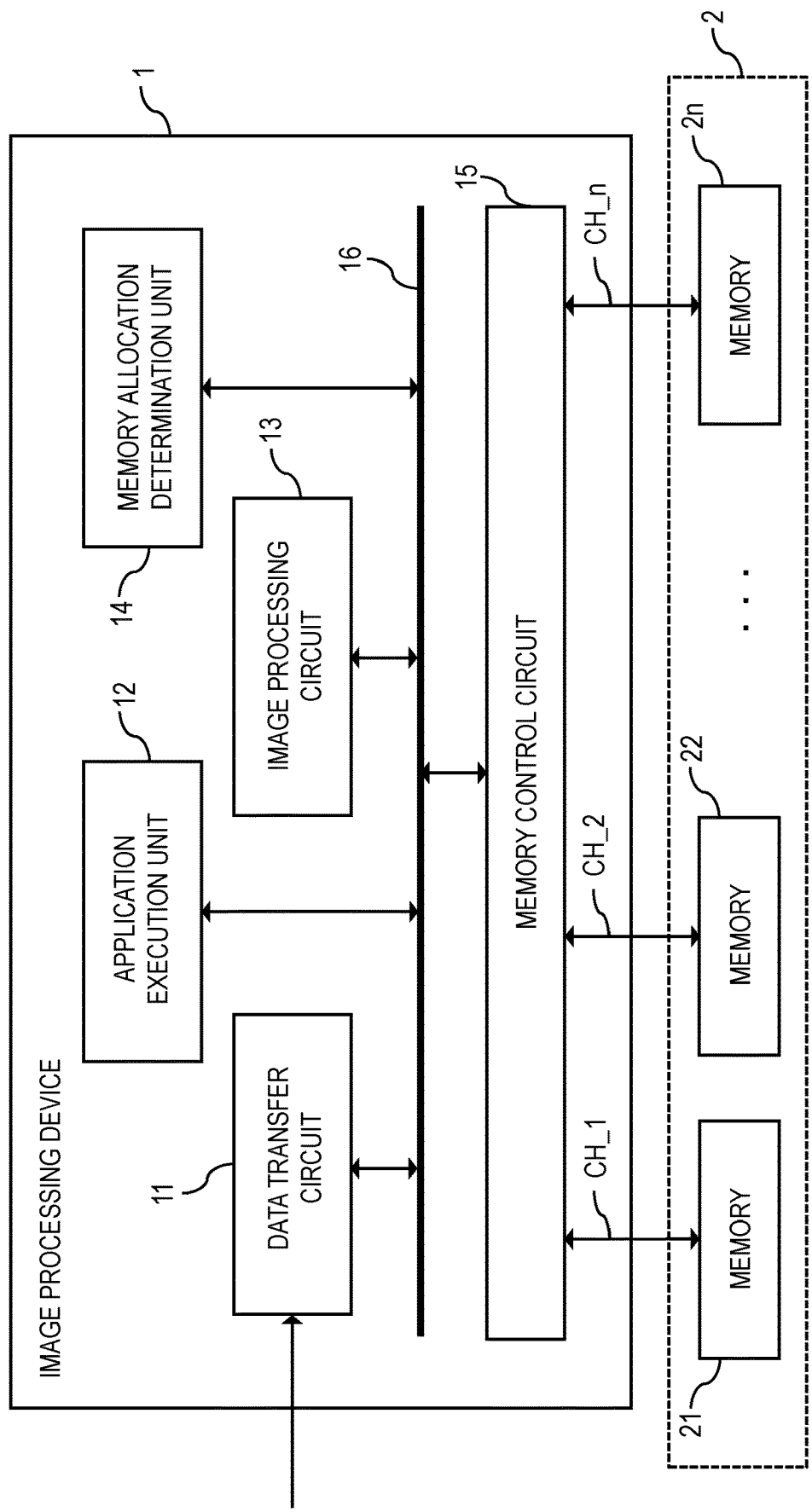
FIG. 1 is a block diagram showing an example of a configuration of an image processing device according to an embodiment.

Hereinafter, an embodiment will be described in detail with reference to the drawings. In the drawings, for convenience of description, the configuration may be omitted or simplified.

FIG. 1 is a block diagram showing an example of a configuration of an image processing device 1 according to the present embodiment. As shown in FIG. 1, the image processing device 1 includes a data transfer circuit 11, an application execution unit 12, an image processing circuit 13, a memory allocation determination unit 14, and a memory control circuit 15. The blocks in the image processing device 1, i.e., the data transfer circuit 11, the application execution unit 12, the image processing circuit 13, the memory allocation determination unit 14, and the memory control circuit 15, are connected to each other via a common bus 16. The blocks in the image processing device 1 may be connected to each other by dedicated lines.

The image processing device 1 is connected to n memories 21-2n. Since n takes on a natural number of 2 or more, a plurality of memories is connected to the image processing device 1. In detail, the memory control circuit 15 in the image processing device 1 has n channels CH_1-CH_n, and each channel is respectively connected to one of the n memories 21-2n, which are external to the image processing device 1. In other words, the image processing device 1 is connected to a plurality of memories in parallel.

In the present embodiment, the memories 21-2n are described as being external to the image processing device 1, but the memories 21-2n may be internal to the image processing device 1. Further, in the present embodiment, when any one memory of the n memories 21-2n or an arbitrary plurality of memories among the n memories 21-2n is shown, it is simply represented as a memory 2.

The data transfer circuit 11 acquires software required for the operation of the image processing device 1 and image data to be targeted for image processing from the outside of the image processing device 1. The software acquired by the data transfer circuit 11 includes application software for performing image processing, driver software for controlling each block in the image processing device 1, and the like. Hereinafter, the application software for performing the image processing will be referred to as an image processing application. Further, the driver software for controlling each block in the image processing device 1 is referred to as a control driver. The data transfer circuit 11 stores the acquired software and image data in the memory 2 via the memory control circuit 15.

The application execution unit 12 is configured by, for example, a processor. The application execution unit 12 reads and executes the image processing application and the control driver stored in the memory 2 via the memory control circuit 15. As will be described in detail later, the application execution unit 12 sets a memory allocation based on memory allocation information for the data transfer circuit 11 and the image processing circuit 13 so that the image data handled by the image processing application is distributedly stored in the n memories 21-2n.

Further, the application execution unit 12 transmits application information to the memory allocation determination unit 14. The application information is information on the image processing and the image data handled by the image processing application. The application execution unit 12 acquires the application information by executing the image processing application. As described above, in the present embodiment, it is described that the application execution unit 12 acquires the application information by executing the image processing application, but this present disclosure is not limited thereto. For example, the application information may be stored in the memory 2 in advance. In this case, the application information is transmitted from the memory 2 to the memory allocation determination unit 14.

Figure 2:
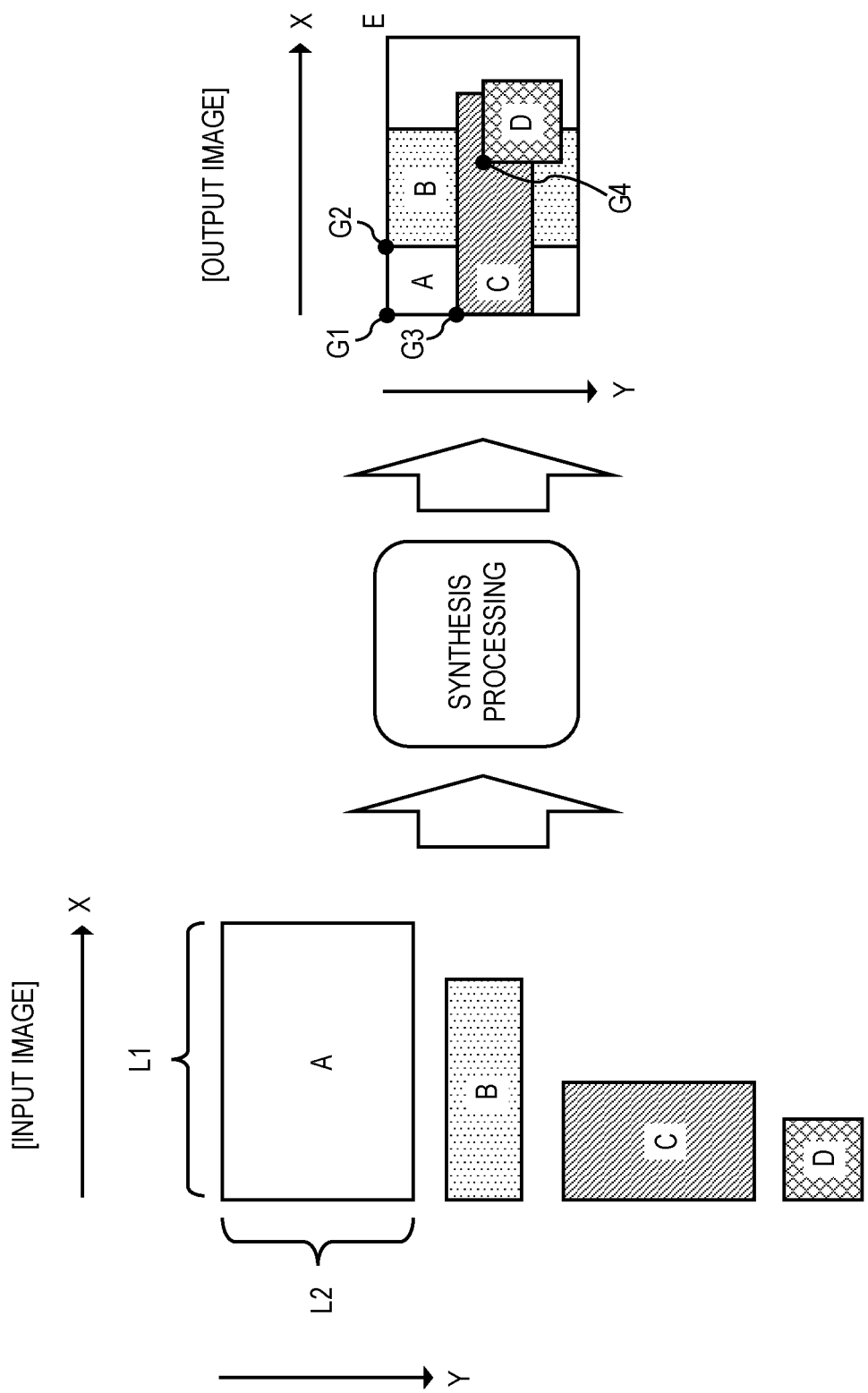
FIG. 2 is a diagram explaining an example of image processing.

FIG. 2 is a diagram explaining an example of the image processing handled by the image processing application. The image processing shown in FIG. 2 is processing for synthesizing four input images A-D to generate one output image E. In this case, the information on the image processing included in the application information is information indicating that the image processing is processing in which the four input images are synthesized to generate the one output image. Further, the information on the image data included in the application information is a screen size for each of the five input and output images, a synthesis position, a color depth indicating the amount of data per pixel of the image, and the like.

The screen size of each image may be represented by a size in the X direction, L1, and a size in the Y direction, L2, as illustrated in the image A of FIG. 2. Further, as illustrated in the output image of FIG. 2, the synthesis position of each input image can be indicated by the position coordinates of the first pixel of each of the input images A-D with the position of the G1 point of the output image E as the origin of the XY coordinates. In FIG. 2, since the screen sizes of the output image E and the input image A are the same, the synthesis position of the input image A is indicated by the position coordinates of the G1 point of the output image E. The synthesis position of the input image B is indicated by the position coordinates of the G2 point of the output image E with reference to the G1 point. Similarly, the synthesis position of the input image C is indicated by the position coordinates of the G3 point of the output image E, and the synthesis position of the input image D is indicated by the position coordinates of the G4 point of the output image E.

Returning to FIG. 1, the description of the configuration of the image processing device 1 will be continued. The image processing circuit 13 is configured by an Intellectual Property (IP) core specialized in image processing. The image processing circuit 13 acquires the image data stored in the memory 2 via the memory control circuit 15. The acquired image data is image data handled by the image processing application. The image processing circuit 13 performs the image processing on the acquired image data, which is handled by the image processing application. The image processing circuit 13 stores the image data on which the image processing is performed in the memory 2 via the memory control circuit 15.

Further, the image processing circuit 13 transmits operation unit-specific information to the memory allocation determination unit 14. The operation unit-specific information is information specific to the image processing circuit 13, and is information indicating a processing unit of image data processed by the image processing circuit 13.

Figure 3:
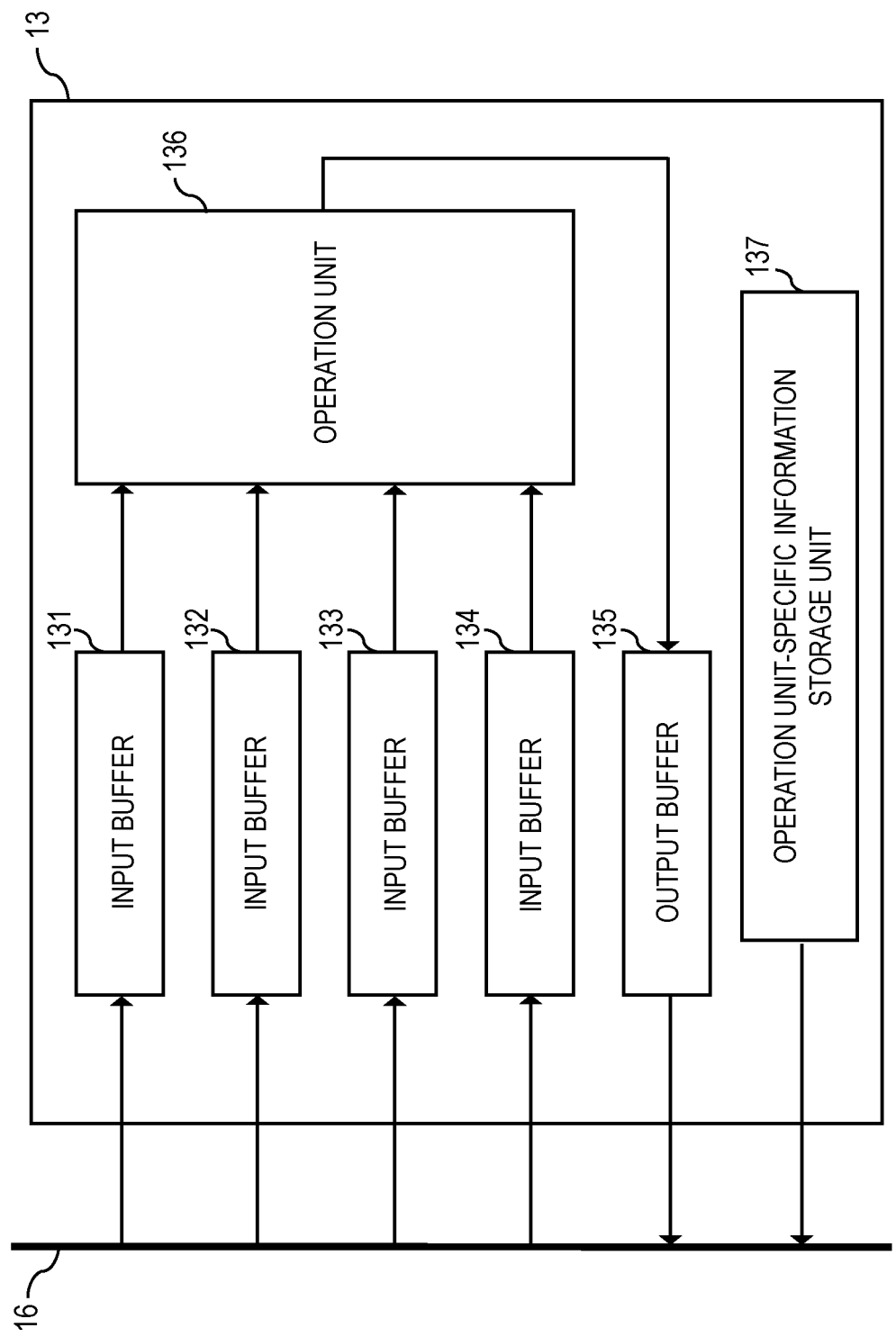
FIG. 3 is a block diagram showing an example of a configuration of an image processing circuit according to the embodiment.

Here, the configuration of the image processing circuit 13 will be described in detail with reference to FIG. 3. FIG. 3 is a block diagram showing an example of the configuration of the image processing circuit 13 according to present embodiment. As shown in FIG. 3, the image processing circuit 13 includes input buffers 131-134, an output buffer 135, an operation unit 136, and an operation unit-specific information storage unit 137.

The input buffers 131-134 are connected to the common bus 16 and the operation unit 136. The input buffers 131-134 receive the image data handled by the image processing application stored in the memory 2 via the common bus 16. The input buffers 131-134 store the received image data and output the received image data to the operation unit 136.

The operation unit 136 performs an image processing operation handled by the image processing application on the image data output from the input buffers 131-134. The operation unit 136 is connected to the output buffer 135. The operation unit 136 outputs the operated image data, that is, the image data on which the image processing is performed to the output buffer 135.

The output buffer 135 stores image data on which the image processing is processed by the operation unit 136. Further, the output buffer 135 is connected to the common bus 16. The output buffer 135 transmits the image data on which the image processing is performed to the memory 2 via the common bus 16. In this manner, the image data on which the image processing is performed is stored in the memory 2.

Since the image processing circuit 13 shown in FIG. 3 includes the four input buffers 131-134, the maximum number of input images that can be handled by one image processing operation is four. That is, the number of input images that can be handled by one image processing operation depends on the number of input buffers in the image processing circuit 13. Although the image processing circuit 13 including four input buffers is illustrated in FIG. 3, the number of input buffers is not limited to four.

Further, since the image processing circuit 13 shown in FIG. includes the one output buffer 135, the maximum number of output images that can be handled by one image processing operation is one. That is, the number of output images that can be handled by one image processing operation depends on the number of output buffers in the image processing circuit 13. Although the image processing circuit 13 including one output buffer is illustrated in FIG. 3, the number of output buffers is not limited to one.

Since the image processing circuit 13 shown in FIG. 3 includes the four input buffers 131-134 and the one output buffer 135, the image processing shown in FIG. 2, that is, the image processing for synthesizing the four input images A-D to generate the one output image E can be performed.

Further, when the size of the image data handled by the image processing application is larger than the size of the image data that can be handled by the image processing circuit 13 in one image processing operation, the image processing circuit 13 divides the image data handled by the image processing application into processing units and performs image processing. The processing unit of the image data is determined depending on the size of the input buffers 131-134 in the image processing circuit 13, the size of the output buffer 135, and the processing capability of the operation unit 136. The processing unit of the image data is a processing unit of the image data processed by the image processing circuit 13, and is information included in the operation unit-specific information.

Figure 4:
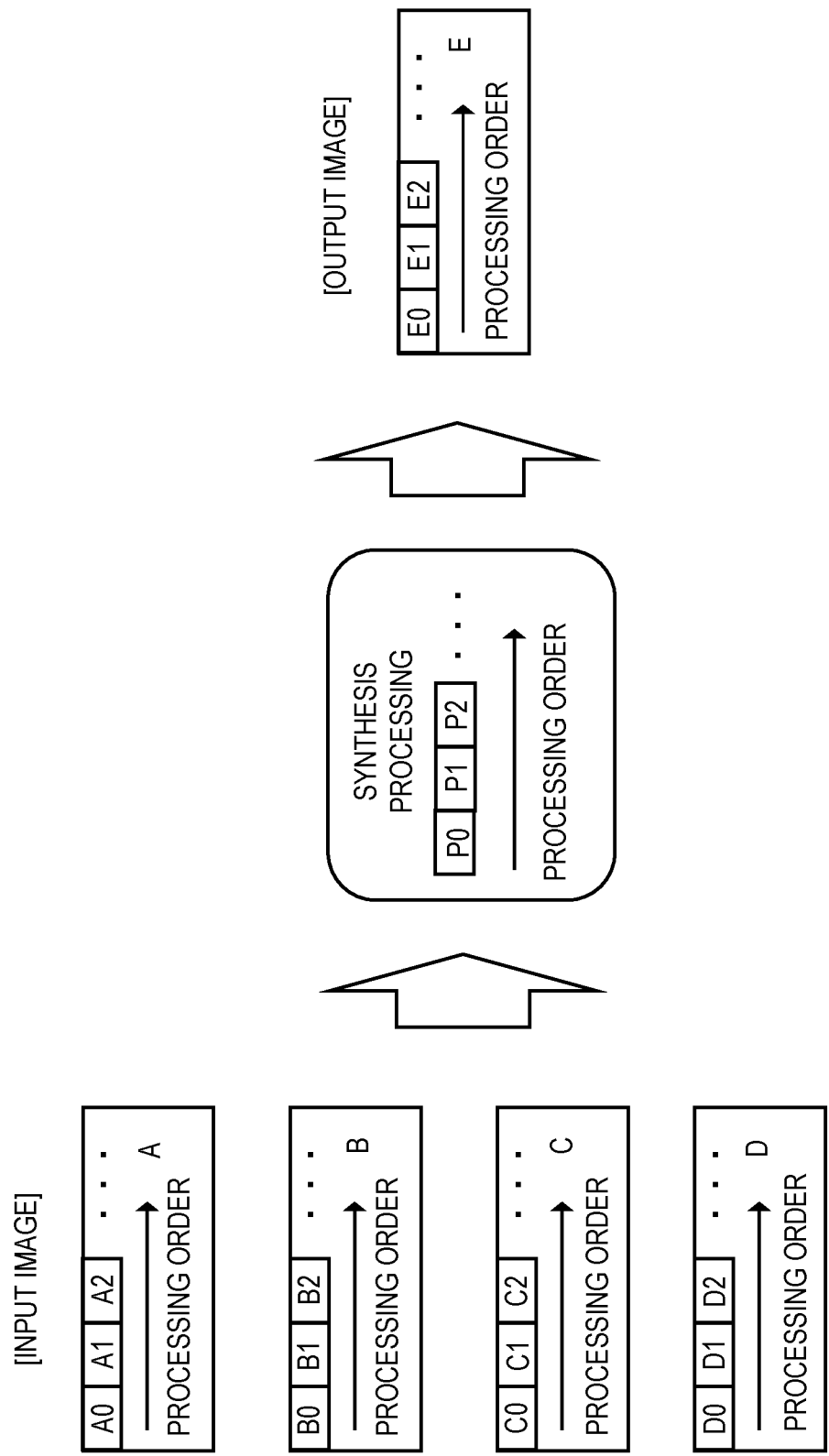
FIG. 4 is a diagram explaining a processing unit of image data.
Figure 5:
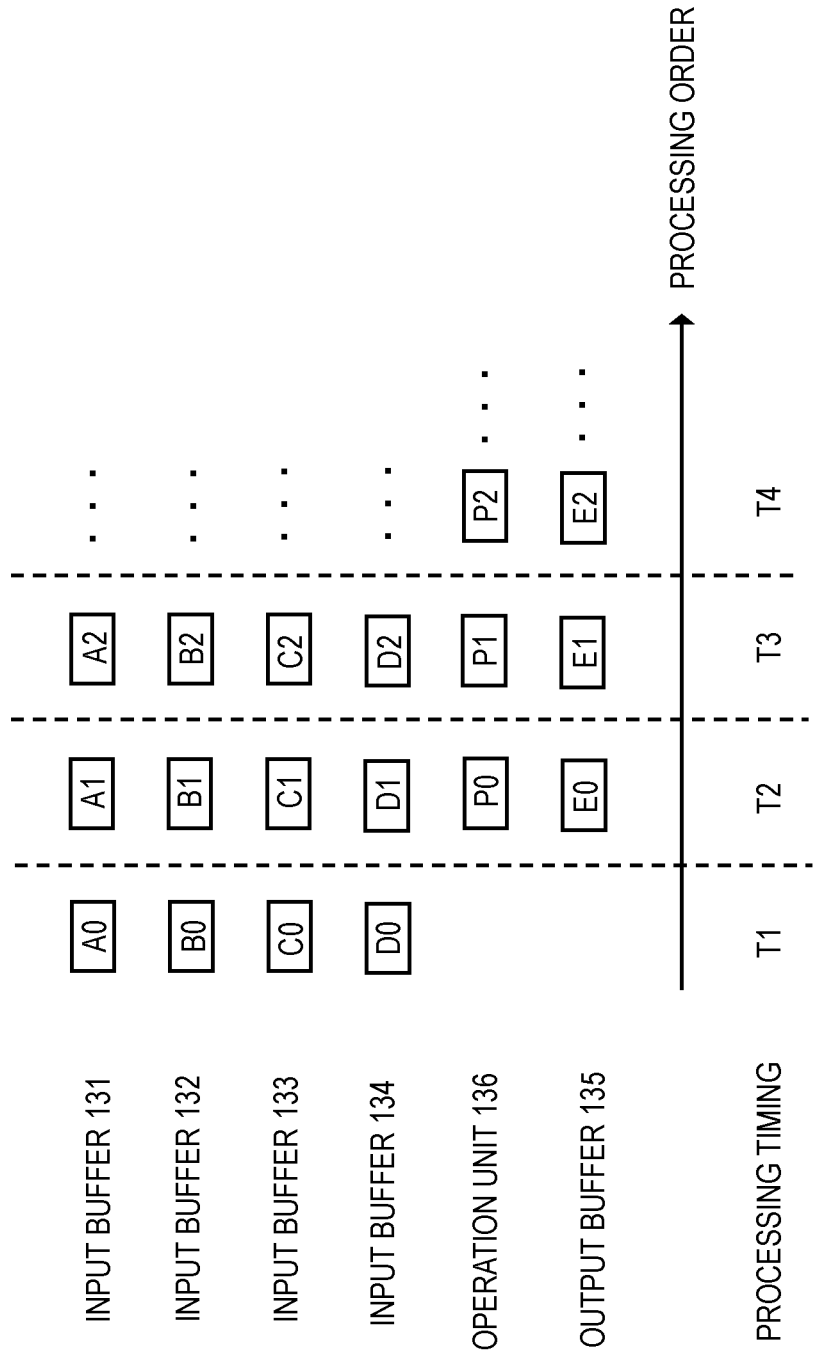
FIG. 5 is a diagram showing a processing order of image data divided into processing units.

Here, with reference to FIGS. 4 and 5, the processing order of the image processing circuit 13 in the case where the image data is divided into processing units will be described. FIG. 4 is a diagram explaining a processing unit of image data. FIG. 5 is a diagram showing a processing order of image data divided into processing units.

The image processing shown in FIG. 4 is processing for synthesizing four input images A-D to generate one output image E in the same manner as the image processing shown in FIG. 2. However, for the sake of simplification of description, it is assumed that the screen sizes of the four input images A-D are all the same, and the color depths of the respective pixels are also the same. It is also assumed that the four input images A-D are synthesized in the same arrangement.

As shown in FIG. 4, each of the input images A-D is divided by the processing unit determined depending on the image processing circuit 13. For example, the input image A is divided into the processing units sequentially from the upper left to the lower right of the input image A, such as A0, A1, A2, . . . . When the first line of the input image A is divided into the processing units up to the right end, the second line of the input image A is then divided into the processing units from left to right. Similarly, the input images B-D are also divided into the processing units. It is assumed that the processing order of the image processing shown in FIG. 4 is the same as the order of dividing the input image. Hereinafter, the image data divided into processing units such as A0 is referred to as processing unit image data.

The input buffers 131-134 store each of the input images A-D divided into the processing units according to the divided order, and output each of the input images A-D divided into processing units to the operation unit 136. For example, as shown in FIG. 5, at the processing timing T1, the input buffers 131-134 store the processing unit image data A0, B0, C0 and D0, and output them to the operation unit 136. Next, at the processing timing T2, the input buffers 131-134 store the processing unit image data A1, B1, C0, and D1, and output them to the operation unit 136. Next, at the processing timing T3, the input buffers 131-134 store the processing unit image data A2, B2, C2, and D2, and output them to the operation unit 136.

As shown in FIG. 4, the operation unit 136 performs the synthesis processing P0, P1, P2, . . . on the input images A-D for each processing unit. The operation unit 136 outputs the processing unit image data E0, E1, E2, . . . in units of processing to the output buffer 135 as results of the synthesis processing. As shown in FIG. 5, at the processing timing T2, the operation unit 136 performs the synthesis processing P0 on the processing unit image data A0, B0, C0 and D0, and outputs the processing unit image data E0, which is the result of the synthesis processing P0, to the output buffer 135. The output buffer 135 stores the processing unit image data E0, and transmits it to the memory 2.

At the processing timing T3, the operation unit 136 performs the synthesis processing P1 on the processing unit image data A1, B1, B1, and D1, and outputs the processing unit image data E1, which is the result of the synthesis processing P1, to the output buffer 135. The output buffer 135 stores the processing unit image data E1, and transmits it to the memory 2.

At the processing timing T4, the operation unit 136 performs the synthesis processing P2 on the processing unit image data A2, B2, C2 and D2, and outputs the processing unit image data E2, which is the result of the synthesis processing P2, to the output buffer 135. The output buffer 135 stores the processing unit image data E2, and transmits it to the memory 2. In the way, the image processing circuit 13 performs the image processing on the four input images A-D by dividing them, and as a result of the image processing, generates the one output image E.

As described above, the processing order of the image data handled by the image processing application can be determined on the basis of the processing unit of the image data processed by the image processing circuit 13, the information on the image processing handled by the image processing application, and the information on the image data handled by the image processing application.

Returning to FIG. 3, the description of the configuration of the image processing circuit 13 will be continued. The operation unit-specific information storage unit 137 stores the operation unit-specific information. Further, the operation unit-specific information storage unit 137 is connected to the common bus 16. The image processing circuit 13 transmits the operation unit-specific information stored in the operation unit-specific information storage unit 137 to the memory allocation determination unit 14. Thus, in the present embodiment, the operation unit-specific information is described as being stored in the operation unit-specific information storage unit 137, but the present disclosure is not limited thereto. For example, the operation unit-specific information may be stored in the memory 2 in advance. In this case, the operation unit-specific information is transmitted from the memory 2 to the memory allocation determination unit 14. When the operation unit-specific information is stored in the memory 2, the operation unit-specific information storage unit 137 is not required.

Returning to FIG. 1, the description of the configuration of the image processing device 1 will be continued. The memory allocation determination unit 14 determines which regions of the n memories 21-2n to allocate the image data handled by the image processing application. That is, the memory allocation determination unit 14 determines the memory allocation of the image data to be handled by the image processing application. At this time, the memory allocation determination unit 14 determines the memory allocation of the image data so that the accesses are not concentrated in a specific memory among the n memory 21-2n on the basis of memory address management information, the operation unit-specific information, and the application information. The memory allocation determination unit 14 transmits the determined memory allocation to the application execution unit 12 as the memory allocation information. The details of the memory allocation determination processing will be described later.

The memory allocation determination unit 14 may be configured by a dedicated circuit or a processor. If the memory allocation determination unit 14 is configured by a processor, the function of the memory allocation determination unit 14 can be realized by the processor executing software for determining the memory allocation. The function of the memory allocation determination unit 14 is shown as each step of FIG. 8 described later, for example. That is, the processing of each step shown in FIG. 8 can be realized by the processor executing software for determining the memory allocation. Therefore, the software for determining the memory allocation is software that causes the image processing device 1 to perform the processing of each step shown in FIG. 8.

Further, when the memory allocation determination unit 14 is configured by a processor, software for determining the memory allocation can be stored in the memory 2. The software for determining the memory allocation can be acquired from outside the image processing device 1 by the data transfer circuit 11, and stored in the memory 2. The processor configuring the memory allocation determination unit 14 may be the same as or different from the processor configuring the application execution unit 21.

The memory control circuit 15 can access a plurality of memories, i.e., the n memories 21-2n, for storing image data handled by the image processing application. As described above, the memory control circuit 15 has the n channels CH_1-CH_n, and each channel is respectively connected to one of the n memories 21-2n, which are external to the image processing device 1. Therefore, the memory controller 15 can access the n memories 21-2n simultaneously, that is, can access them in parallel.

Further, the memory control circuit 15 transmits memory address management information to the memory allocation determination unit 14. The memory address management information is information indicating how the addresses (access addresses) used for accessing the image data stored in the n memories 21-2n by the image processing device 1 are allocated to the n memories 21-2n. That is, the memory address management information is information indicating the correspondence relation between the n memories 21-2n and the access addresses of the n memories 21-2n. On the basis of this information, a combination of addresses that can be accessed in parallel and a combination of addresses that cannot be accessed in parallel can be identified.

Figure 6:
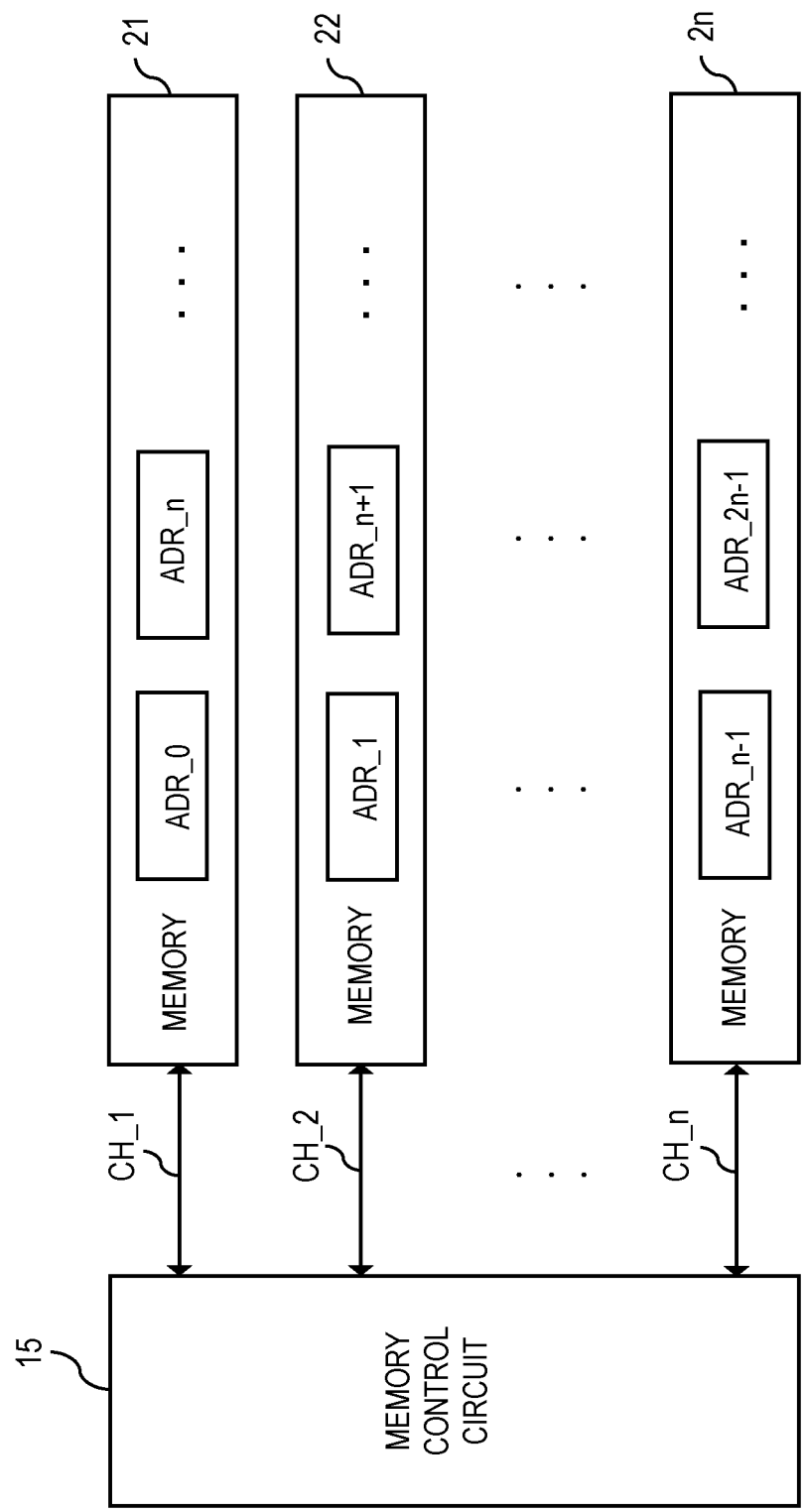
FIG. 6 is a diagram explaining a correspondence relation between memories and access addresses.

Here, the details of the memory address management information will be described with reference to FIG. 6. FIG. 6 is a diagram explaining the correspondence relation between the n memories 21-2n and the access addresses. As shown in FIG. 6, the memory control circuit 15 is connected to the n memories 21-2n via the n channels CH_1-CH_n. The n memories 21-2n are allocated to addresses (access addresses) for accessing the stored image data. For example, an address 0 (ADR_0), an address n (ADR_n), . . . are allocated to the memory 21. An address 1 (ADR_1), an address n+1 (ADR_n+1), . . . are allocated to the memory 22. An address n−1 (ADR_n−1), an address 2n−1 (ADR_2n−1), . . . are allocated to the memory 2n. For example, the memory address management information becomes information indicating the correspondence relation between the memories and the access addresses shown in FIG. 6.

The memory control circuit 15 can access to different memories in parallel. For example, in the case of FIG. 6, the address 0 (ADR_0) of the memory 21 and the address 1 (ADR_1) of the memory 22 can be accessed in parallel. On the other hand, the memory control circuit 15 cannot access the same memory in parallel. For example, in the case of FIG. 6, the address 0 (ADR_0) of the memory 21 and the address n (ADR_n) of the memory 21 cannot be accessed in parallel. In this way, the combination of the addresses that can be accessed in parallel and the combination of the addresses that cannot be accessed in parallel can be identified on the basis of the memory address management information.

Further, in the present embodiment, the memory address management information is transmitted from the memory control circuit 15 to the memory allocation determination circuit 14, but the present disclosure is not limited thereto.

For example, the memory address management information may be stored in the memory 2 in advance. In this case, the memory address management information is transmitted from the memory 2 to the memory allocation determination unit 14.

Figure 7:
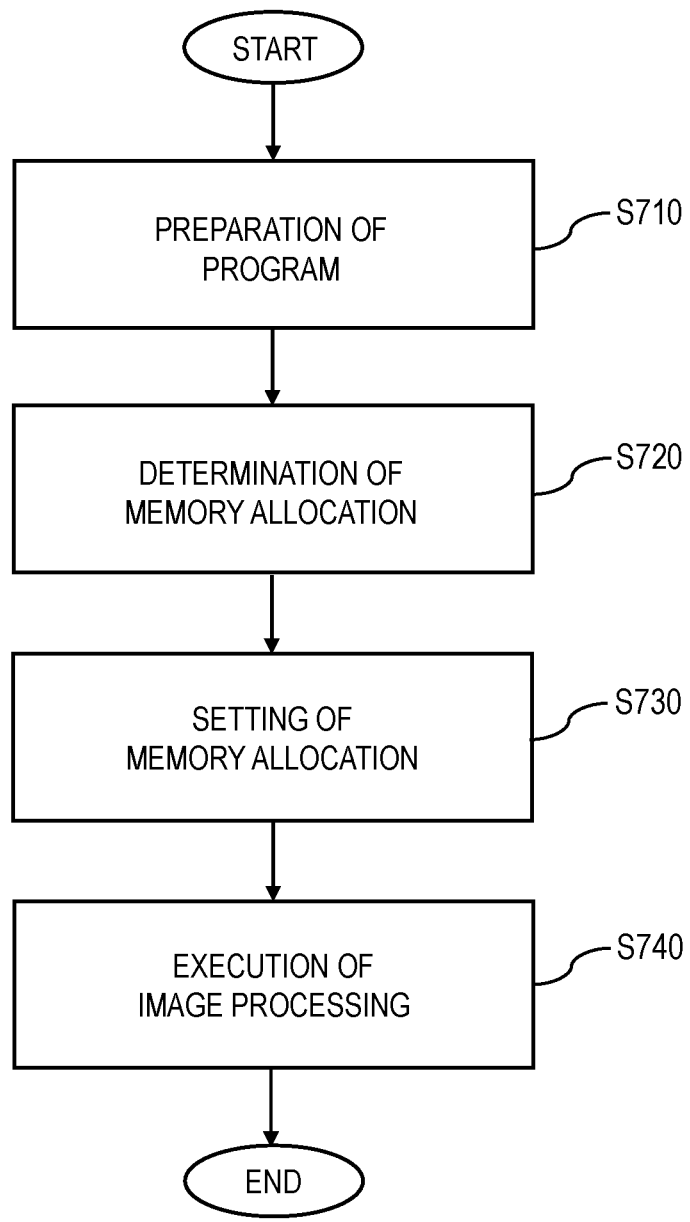
FIG. 7 is a flowchart showing an example of an operation of the image processing device according to the embodiment.

Next, the operation of the image processing device 1 will be described. FIG. 7 is a flowchart showing an example of the operation of the image processing device 1 according to the present embodiment. The flowchart of FIG. 7 includes four processing steps S710-S740. First, in the step S710, processing for preparing programs is performed. In the processing for preparing the programs, the data transfer circuit 11 acquires image processing application for performing image processing and control drivers for controlling the respective blocks in the image processing device 1 from the outside of the image processing device 1, and stores them in the memory 2. When the memory allocation determination unit 14 is configured by a processor, the data transfer circuit 11 acquires software for determining the memory allocation from the outside of the image processing device 1, and stores the acquired software in the memory 2.

In the step S720, processing for determining a memory allocation is performed. In the processing for determining the memory allocation, the memory allocation determination unit 14 determines the memory allocation of the image data handled by the image processing application.

Figure 8:
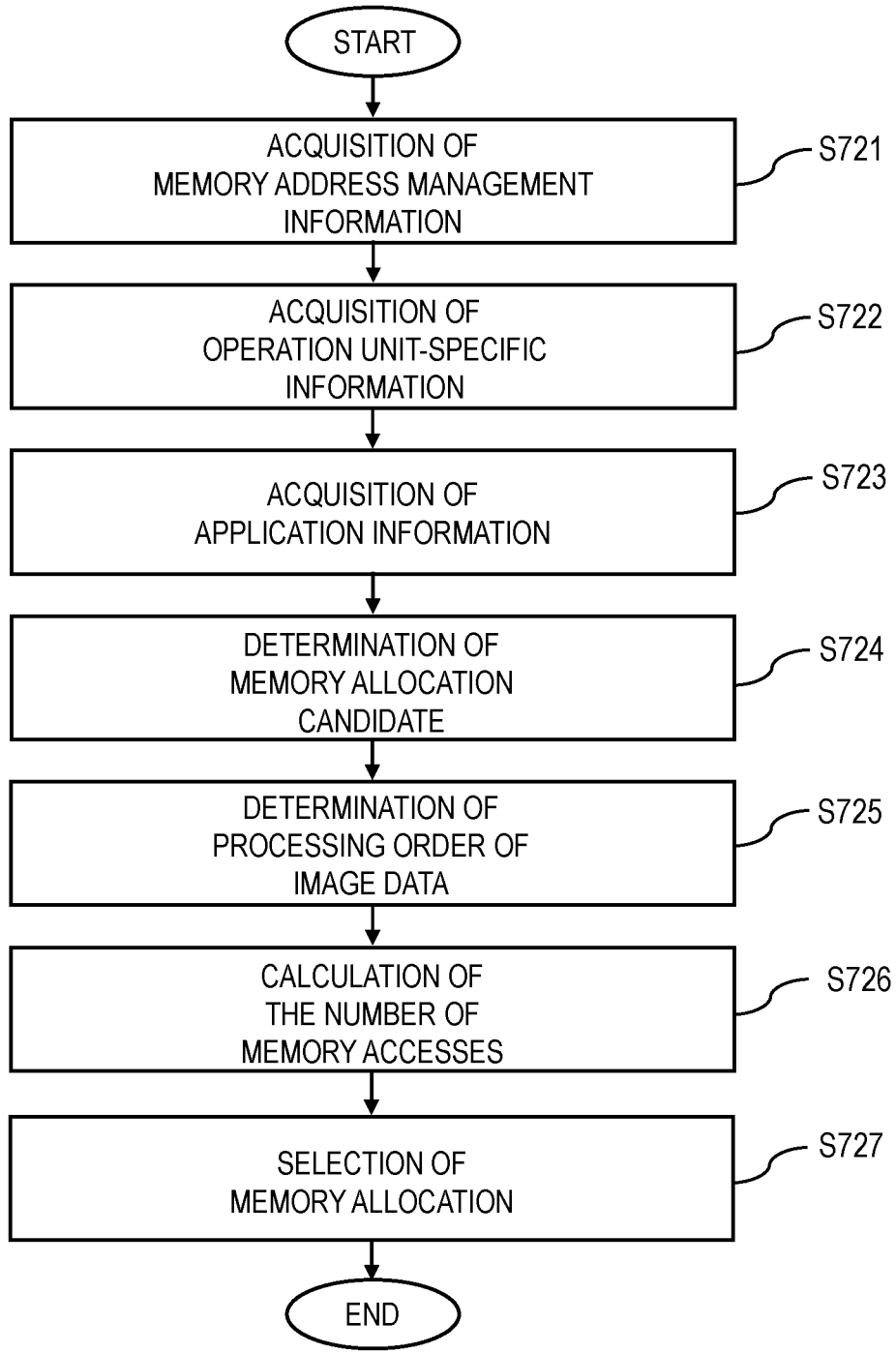
FIG. 8 is a flowchart showing an example of processing for determining a memory allocation.

Here, the details of the processing for determining the memory allocation with reference to FIG. 8. FIG. 8 is a flowchart showing an example of the processing for determining the memory allocation. The flowchart of FIG. 8 includes seven processing steps S721-S727. First, in the step S721, processing for acquiring the memory address management information is performed. In the processing for acquiring the memory address management information, the memory allocation determination unit 14 acquires the memory address management information from the memory control circuit 15. As described above, the memory address management information is information indicating the correspondence relation between the n memories 21-2n and the access addresses.

In the step S722, processing for acquiring the operation unit-specific information is performed. In the processing for acquiring the operation unit-specific information, the memory allocation determination unit 14 acquires the operation unit-specific information from the image processing circuit 13. As described above, the operation unit-specific information is information indicating the processing unit of the image data processed by the image processing circuit 13.

In the step S723, processing for acquiring the application information is performed. In the processing for acquiring the application information, the memory allocation determination unit 14 acquires the application information from the application execution unit 12. As described above, the application information is information on the image processing and the image data handled by the image processing application. The information on the image data handled by the image processing application includes the screen size and the color depth of the input image input to the image processing circuit 13 and the output image output from the image processing circuit 13. The input image is the image to be targeted for the image processing handled by the image processing application. The output image is the image on which the image processing handled by the image processing application is performed. Further, when the image processing performed by the operation unit 136 of the image processing circuit 13 is synthesis processing, the information on the image data handled in the image processing includes information on the synthesis position.

In the step S724, processing for determining memory allocation candidates is performed. In the processing for determining the memory allocation candidates, the memory allocation determination unit 14 determines a plurality of memory allocation candidates on the basis of the memory address management information, the operation unit-specific information, and the application information. At this time, the memory allocation determination unit 14 determines, as the memory allocation candidates, a plurality of allocation patterns of the processing unit image data handled by the image processing application for the n memories 21-2n.

However, when determining the memory allocation candidates, the memory allocation determination unit 14 may determine, as the memory allocation candidates, only the allocation patterns in which the processing unit image data is allocated to the memory 2 according to the processing order of the processing unit image data. For example, in the case of the input image A of FIG. 4, the processing unit image data A0, A1, and A2 are allocated to memory 2 in order. In this case, the address of the processing unit image data A0 to the memory 2 is the smallest, and the address of the processing unit image data A2 to the memory 2 is the largest.

Further, when determining the memory allocation candidates, the memory allocation determination unit 14 may determine, as the memory allocation candidates, only the allocation patterns in which the image data of the same image is allocated preferentially to the same memory. For example, in the example of FIG. 4, the processing unit image data A0, A1, and A2 are allocated to the memory 21, the processing unit image data B0, B1, and B2 are allocated to the memory 22, the processing unit image data C0, C1, and C2 are allocated to the memory 23, and the processing unit image data D0, D1, and D2 are allocated to the memory 24.

In this way, when determining the memory allocation candidates, the memory allocation determination unit 14 can effectively reduce the number of memory allocation candidates by considering the processing order of the image data and allocating the image data of the same image to the same memory.

In the step S725, processing for determining the processing order of the image data is performed. In the processing for determining the processing order of the image data, the memory allocation determination unit 14 determines the processing order of the image data handled by the image processing application on the basis of the operation unit-specific information and the application information. The processing order of the image data may be determined by the processing unit of the image data included in the operation unit-specific information and the information on the image data included in the application information, as described with reference to FIG. 5.

In the step S726, processing for calculating the number of memory accesses is performed. In the processing for calculating the number of memory accesses, the memory allocation determination unit 14 calculates, for each of the memory allocation candidates, the number of memory accesses on the basis of the plurality of memory allocation candidates determined by the step S724, the processing order of the image data determined by the step S725, and the memory address management information.

Specifically, the memory allocation determination unit 14 calculates, for each of the memory allocation candidates determined by the step S724, the number of accesses when the n memories 21-2n are accessed in the processing order of the image data determined by the step S725. At this time, the memory allocation determination unit 14 calculates the number of accesses with reference to the memory address management information. As described above, the combination of the addresses that can be accessed in parallel and the combination of the addresses that cannot be accessed in parallel can be identified on the basis of the memory address management information. Therefore, by referring to the memory address management information, the memory allocation determination unit 14 can identify the allocation of the image data for which the parallel access is possible and the allocation of the image data for which the parallel access is not possible, and as a result, the memory allocation determination unit 14 can appropriately calculate the number of accesses to the n memories 21-2n.

In the step S726, the memory allocation determination unit 14 calculates the number of accesses to the n memories 21-2n for all of the memory allocation candidates determined by the step S724.

Figure 9:
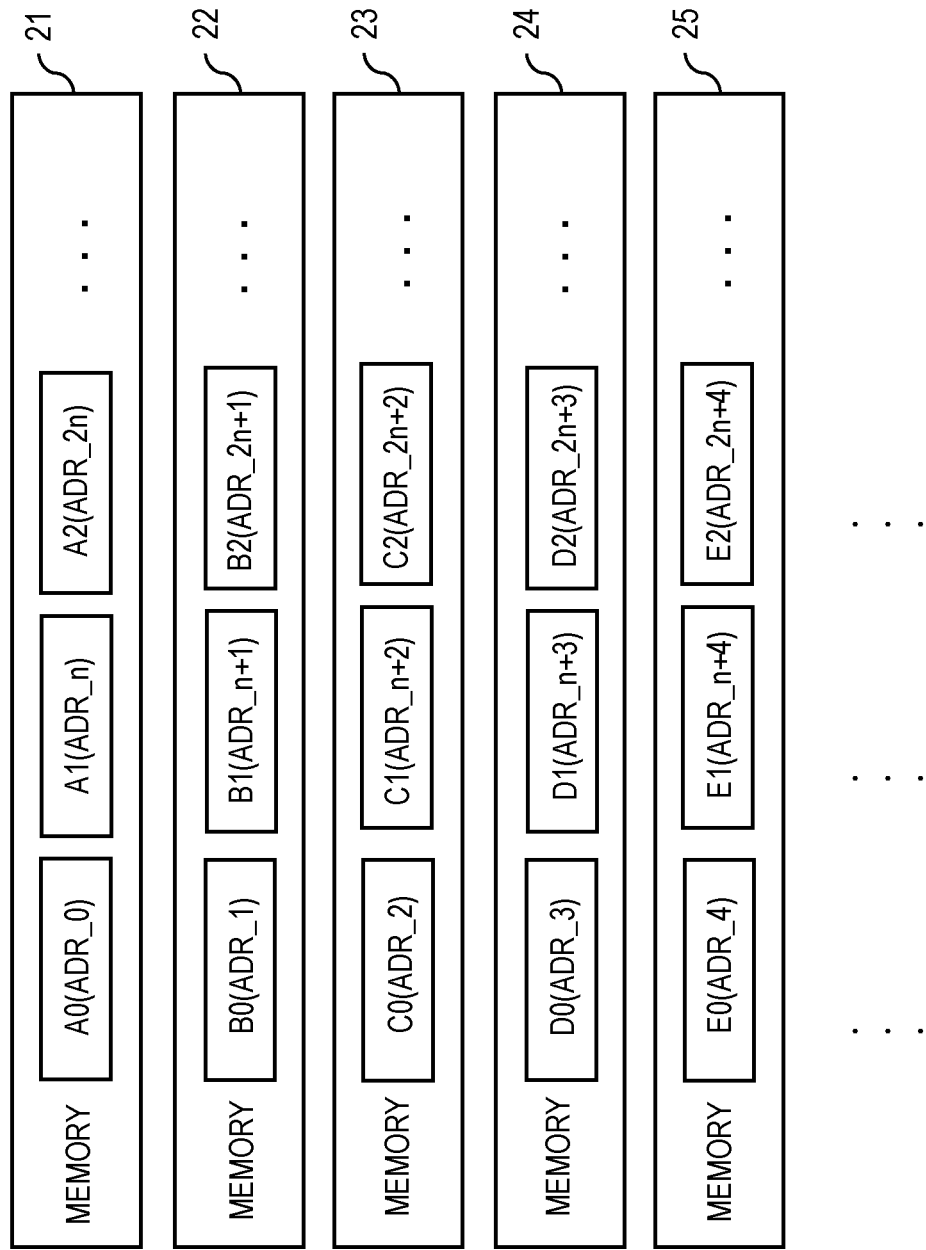
FIG. 9 is a diagram showing an example of the memory allocation candidate.

Here, a specific example of the processing for calculating the number of memory accesses will be described with reference to FIGS. 9 and 10. FIG. 9 is a diagram showing an example of the memory allocation candidate. In the memory allocation candidate of FIG. 9, the processing unit image data A0, A1, and A2 are allocated to the memory 21, and the processing unit image data B0, B1, and B2 are allocated to the memory 22, and the processing unit image data C0, C1, and C2 are allocated to the memory 23, and the processing unit image data D0, D1, and D2 are allocated to the memory 24, and the processing unit image data E0, E1, and E2 are allocated to the memory 25.

FIG. 10 is a diagram showing another example of the memory allocation candidate. In the memory location candidate of FIG. 10, the processing unit image data A0, B0, and C0 are allocated to the memory 21, the processing unit image data A1, B1, and C1 are allocated to the memory 22, the processing unit image data A2, B2, and C2 are allocated to the memory 23, the processing unit image data D0, D1, and D2 are allocated to the memory 24, and the processing unit image data E0, E1, and E2 are allocated to the memory 25.

The addresses in the parentheses added to each of the processing unit image data of FIGS. 9 and 10 indicate the accesses address to the memories 21-25. The correspondence relation between the access addresses and the memories 21-25 shown in FIGS. 9 and 10 is the same as that of FIG. 6.

The memory allocation determination unit 14 calculates, for the memory allocation candidate of FIG. 9, the number of memory accesses when the memories 21-25 are accessed in the processing order of the image data shown in FIG. 5. Specifically, first, the memory allocation determination unit 14 identifies the processing unit image data A0, B0, C0, and D0 at the processing timing T1 with reference to the processing order of the image data shown in FIG. 5. Next, the memory allocation determination unit 14 identifies the allocation of the processing unit image data A0, B0, C0, and D0 to the memories 21-25 with reference to the memory allocation candidate of FIG. 9. Next, the memory allocation determination unit 14 calculates the number of accesses to the memories 21-25 with reference to the memory address management information. In the memory allocation candidate of FIG. 9, since all the processing unit image data A0, B0, C0, and D0 are allocated to different memories, the memory allocation determination unit 14 calculates the number of accesses to the memories 21-25 at the processing timing T1 as one time.

The memory allocation determination unit 14 similarly calculates the numbers of accesses to the memories 21-25 for the processing timings T2-T4. As a result, the numbers of accesses to the memories 21-25 at the processing timings T2-T4 are calculated as one time, one time, and one time, respectively. Therefore, the memory allocation determination unit 14 calculates the number of accesses to the memories 21-25 for the memory allocation candidate of FIG. 9 as four times. As described above, the memory allocation determination unit 14 can calculate the number of memory accesses for the memory allocation candidate by calculating the number of memory accesses for each processing timing and adding the calculated number of memory accesses.

Further, the memory allocation determination unit 14 calculates, for the memory allocation candidate of FIG. 10, the number of memory accesses when the memories 21-25 are accessed in the processing order of the image data shown in FIG. 5. The method of calculating the number of memory accesses is the same as that of calculating the memory allocation candidate of FIG. 9. However, the memory allocation candidate of FIG. 10, unlike the memory allocation candidate of FIG. 9, includes the allocation of the image data which cannot be accessed in parallel.

In the memory location candidate of FIG. 10, since the processing unit image data A0, B0, and C0 are allocated to the same memory 21, the memory allocation determination unit 14 determines that the parallel access to the processing unit image data A0, B0, and C0 is not possible at the processing timing T1. As a result, the memory allocation determination unit 14 calculates the number of memory accesses at the processing timing T1 as three times. Similar to the processing timing T1, the processing timings T2 and T3 also include the allocation of image data that cannot be accessed in parallel. Therefore, the memory allocation determination unit 14 calculates the number of memory accesses at the processing timing T2 as three times and the number of memory accesses at the processing timing T3 as three times. Since the processing timing T4 is the allocation of the image data that can be accessed in parallel, the memory allocation unit 14 calculates the number of memory accesses at the processing timing T4 as one time. As a result, the memory allocation determination unit 14 calculates the number of accesses to the memories 21-25 for the memory allocation candidate of FIG. 10 as 10 times.

Returning to FIG. 8, the details of the description of the processing for determining the memory allocation will be continued. I the step S727, processing for selecting the memory allocation is performed. In the processing for selecting the memory allocation, the memory allocation determination unit 14 determines the memory allocation on the basis of the number of accesses to the n memories 21-2*n* calculated for each memory allocation candidate. Specifically, the memory allocation determination unit 14 compares the numbers of memory accesses calculated for each memory allocation candidate. The memory allocation determination unit 14 selects, on the basis of the comparison result, the memory allocation candidate having the smallest number of accesses to the n memories 21-2*n*. The memory allocation determination unit 14 determines the selected memory allocation candidate as the memory allocation of the image data handled by the image processing application.

As described above, the memory allocation determination unit 14 selects the smallest number of memory accesses among the numbers of memory accesses calculated in the step S726. The memory allocation determination unit 14 determines the memory allocation candidate corresponding to the selected number of memory accesses as the memory allocation of the image data handled by the image processing application. Further, the memory allocation determination unit 14 transmits the determined memory allocation to the application execution unit 12 as the memory allocation information.

As described above, the processing for determining the memory allocation of the step S720 of FIG. 7 is performed by performing the processing of the steps S721-S727 of FIG. 8. Returning to FIG. 7, the description of the operation of the image processing device 1 will be continued. In the step S730, processing for setting the memory allocation is performed. In the processing for setting the memory allocation, the application execution unit 12 sets, for the data transfer circuit 11 and the image processing circuit 13, the memory allocation based on the memory allocation information so that the image data handled by the image processing application is distributedly stored in the n memories 21-2*n*.

Specifically, the application execution unit 12 sets, for the data transfer circuit 11, the memory allocation of the input image based on the memory allocation information. As a result, the data transfer circuit 11 can distributedly store the image data of the input image input to the image processing circuit 13, that is, the image data to be targeted for the image processing handled by the image processing application in the n memories 21-2*n*.

Further, the application execution unit 12 sets, for the image processing circuit 13, the memory allocation of the output image based on the memory allocation information. As a result, the image processing circuit 13 can distributedly store the image data of the output image output from the image processing circuit 13, that is, the image data to be targeted for the image processing handled by the image processing application in the n memories 21-2*n*.

In the step S740, image processing based on the image processing application is performed. In the step S740, the application execution unit 12 makes settings for causing the data transfer circuit 11 and the image processing circuit 13 to start the operation of the image processing based on the image processing application, and determinations whether the image processing based on the image processing application has been completed.

The data transfer circuit 11 starts the operation of the image processing based on the image processing application in response to the setting of the operation start by the application execution unit 12. Specifically, the data transfer circuit 11 acquires image data to be targeted for the image processing handled by the image processing application from the outside of the image processing device 1. The data transfer circuit 11 distributedly stores the acquired image data in the n memories 21-2*n* in accordance with the memory allocation of the input image set by the application execution unit 12.

Further, the image processing circuit 13 starts the operation of the image processing based on the image processing application in response to the setting of the operation start by the application execution unit 12. Specifically, the image processing circuit 13 inputs, to the input buffers 131-134, image data which is distributedly stored in the n memories 21-2*n* and is to be targeted for the image processing handled by the image processing application. At this time, the image processing circuit 13 divides the image data which is stored in the memory 2 and is to be targeted for the image processing handled by the image processing application, that is, the image data of the input image into processing units, and inputs them to the input buffers 131-134.

The operation unit 136 performs the image processing operation handled by the image processing application on the processing unit image data input to the input buffers. The operation unit 136 outputs, to the output buffer 135, the operated processing unit image data, that is, the processing unit image data on which the image processing is performed. The processing unit image data on which the image processing is performed is stored in the output buffer 135. The image processing circuit 13 distributedly stores the processing unit image data stored in the output buffer 135 into the n memories 21-2n, in accordance with the memory allocation of the output image set by the application execution unit 12. The image processing circuit 13 sequentially performs the image processing on all of the image data divided into the processing units.

The data transfer circuit 11 and the image processing circuit 13 perform the processing for taking in the image data, the processing for storing the image data in the memory 2 and the image processing operation, for all the image data handled by the image processing application.

Finally, the application execution unit 12 determinations whether the image processing based on the image processing application has been completed. By performing this processing, it is determined that all the processing in the data transfer circuit 11 and the image processing circuit 13 has been completed, and that all the image processing for the image data handled by the image processing application has been completed.

The processing of the steps S730 and S740 is realized by the processor configuring the application execution unit 12 executing the image processing application. Therefore, the image processing application is software that causes the image processing device 1 to perform the processing of the steps S730 and S740. Further, when the processing of the steps S730 and S740 is performed, in addition to the image processing application, the control drivers may be executed.

As described above, the application execution unit 12 distributedly stores the image data to be targeted for the image processing handled by the image processing application and the image data on which the image processing handled by the image processing application has been performed in the n memories 21-2n, by setting, for the data transfer circuit 11 and the image processing circuit 13, the memory allocation based on the memory allocation information. In other words, the application execution unit 12 distributedly stores the image data handled by the image processing application in the n memories 21-2n on the basis of the memory allocation determined by the memory allocation determination unit 14.

As described above, according to present embodiment, the memory allocation determination unit 14 determines the memory allocation of the image data handled by the image processing application on the basis of the memory address management information, the operation unit-specific information, and the application information. At this time, the memory allocation is determined so that the number of accesses to the n memories 21-2n is reduced. Therefore, the application execution unit 12 can distributedly store the image data handled by the image processing application to the n memories 21-2n on the basis of the determined memory allocation. As a result, the performance improvement by the parallelization of the memory access is expected because the image data is stored in the n memories 21-2n so that the accesses to a specific memory are not concentrated.

Although the invention made by the present inventors has been specifically described based on the embodiment, it is needless to say that the present invention is not limited to the above-described embodiment, and various changes may be made without departing from the scope thereof.

What is claimed is:

1. An image processing device comprising:
an application execution processor configured to execute an image processing application;
an image processing circuit configured to perform image processing handled by the image processing application;
a memory control circuit configured to access a plurality of memories for storing image data handled by the image processing application; and
a memory allocation determination circuit configured to determine a memory allocation of the image data handled by the image processing application based on memory address management information, operation unit-specific information and application information,
wherein the memory address management information comprises information indicating a correspondence relation between the plurality of memories and access addresses for the plurality of memories,
wherein the operation unit-specific information comprises information indicating a unit of the image data processed by the image processing circuit,
wherein the application information comprises information on the image processing and the image data handled by the image processing application,
wherein the application execution processor is configured to distributedly store the image data handled by the image processing application in the plurality of memories based on the memory allocation determined by the memory allocation determination circuit, and
wherein the memory allocation determination circuit is configured to:
determine, as a plurality of memory allocation candidates, a plurality of allocation patterns of the unit of the image data handled by the image processing application for the plurality of memories based on the memory address management information, the operation unit-specific information, and the application information;
determine a processing order of the image data handled by the image processing application based on the operation unit-specific information and the application information;
calculate a number of accesses when the plurality of memories is accessed in the processing order of the image data determined for each of the memory allocation candidates; and
determine the memory allocation based on the number of accesses calculated for each of the memory allocation candidates.

2. The image processing device according to claim 1, further comprising a data transfer circuit configured to store the image data handled by the image processing application in the plurality of memories,
wherein the application execution processor is configured to set in the data transfer circuit a memory allocation of an input image based on the memory allocation determined by the memory allocation determination circuit, and
wherein the data transfer circuit is configured to distributedly store the image data handled by the image processing application in the plurality of memories in accordance with the memory allocation of the input image.

3. The image processing device according to claim 2, wherein the image data stored in the plurality of memories by the data transfer circuit comprises image data to be targeted for the image processing handled by the image processing application.

4. The image processing device according to claim 1,
wherein the application execution processor is configured to set in the image processing circuit a memory allocation of an output image based on the memory allocation determined by the memory allocation determination circuit, and
wherein the image processing circuit is configured to distributedly store the image data handled by the image processing application in the plurality of memories in accordance with the memory allocation of the output image.

5. The image processing device according to claim 4, wherein the image data stored in the plurality of memories by the image processing circuit comprises image data on which the image processing handled by the image processing application is performed.

6. An image processing device comprising:
a processor configured to execute an image processing application and software for determining a memory allocation;
an image processing circuit configured to perform image processing handled by the image processing application; and
a memory control circuit configured to access a plurality of memories for storing image data handled by the image processing application,
wherein, when executed by the processor, the software causes the image processing device to:
acquire memory address management information indicating a correspondence relation between the plurality of memories and access addresses for the plurality of memories;
acquire operation unit-specific information indicating a unit of the image data processed by the image processing circuit;
acquire application information comprising information on the image processing and the image data handled by the image processing application; and
determine a memory allocation of the image data handled by the image processing application based on the memory address management information, the operation unit-specific information, and the application information,
wherein, when executed by the processor, the image processing application causes the image processing device to distributedly store the image data handled by the image processing application in the plurality of memories based on the determines memory allocation, and
wherein, when executed by the processor, the software causes the image processing device to:
determine, as a plurality of memory allocation candidates, a plurality of allocation patterns of the unit of the image data handled by the image processing application for the plurality of memories based on the memory address management information, the operation unit-specific information, and the application information;
determine a processing order of the image data handled by the image processing application based on the operation unit-specific information and the application information;
calculate a number of accesses when the plurality of memories is accessed in the processing order of the image data determined for each of the memory allocation candidates; and
determine the memory allocation based on the number of accesses calculated for each of the memory allocation candidates.

7. The image processing device according to claim 6, further comprising a data transfer circuit configured to store the image data handled by the image processing application in the plurality of memories,
wherein, when executed by the processor, the image processing application causes the image processing device to set in the data transfer circuit a memory allocation of an input image based on the determines memory allocation, and
wherein the data transfer circuit is configured to distributedly store the image data handled by the image processing application in the plurality of memories in accordance with the memory allocation of the input image.

8. The image processing device according to claim 7, wherein the image data stored in the plurality of memories by the data transfer circuit comprises image data to be targeted for the image processing handled by the image processing application.

9. The image processing device according to claim 6,
wherein, when executed by the processor, the image processing application causes the image processing device to set in the image processing circuit a memory allocation of an output image based on the determined memory allocation determined, and
wherein the image processing circuit is configured to distributedly store the image data handled by the image processing application in the plurality of memories in accordance with the memory allocation of the output image.

10. The image processing device according to claim 9, wherein the image data stored in the plurality of memories by the image processing circuit comprises image data on which the image processing handled by the image processing application is performed.

* * * * *